E. B. PAUL.
LOOM FOR WEAVING FLAT RINGS.
APPLICATION FILED JULY 15, 1920.
1,362,134.
Patented Dec. 14, 1920.
7 SHEETS—SHEET 1.
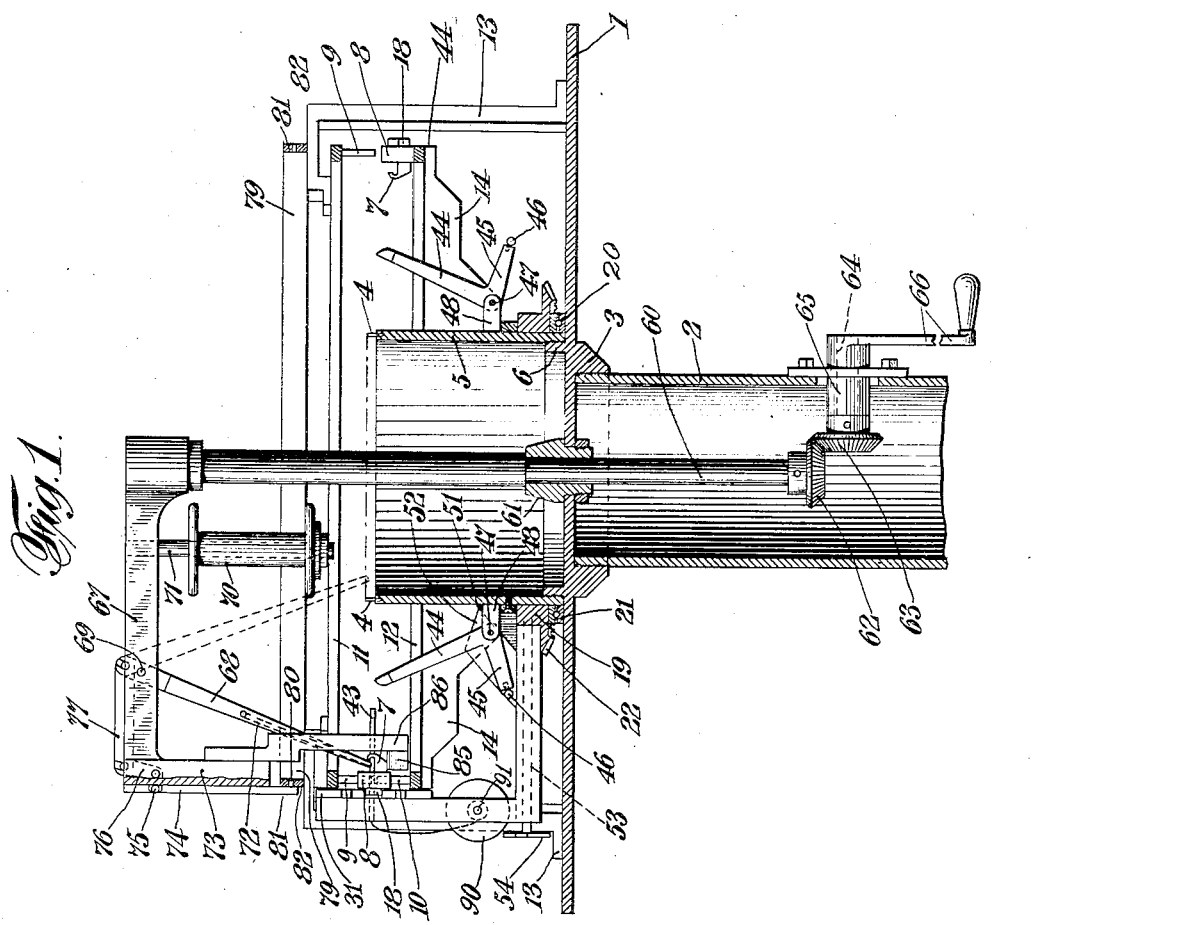

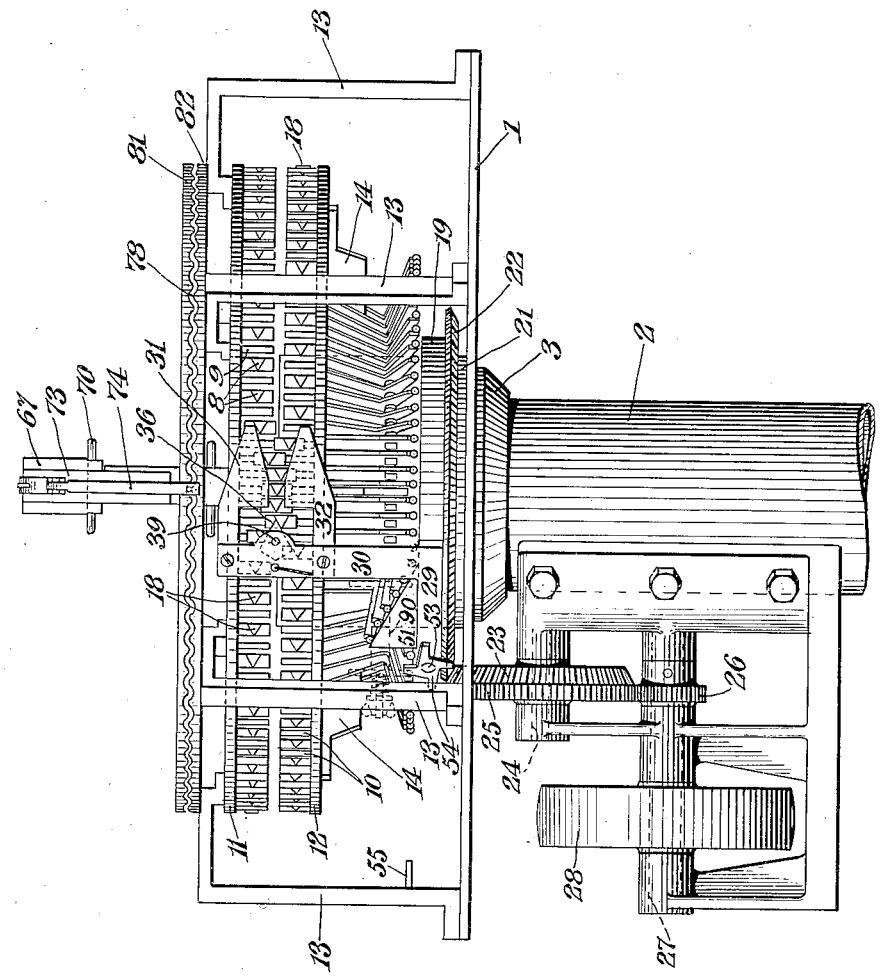

E. B. PAUL.
LOOM FOR WEAVING FLAT RINGS.
APPLICATION FILED JULY 15, 1920.
1,362,134.
Patented Dec. 14, 1920.
7 SHEETS—SHEET 3.
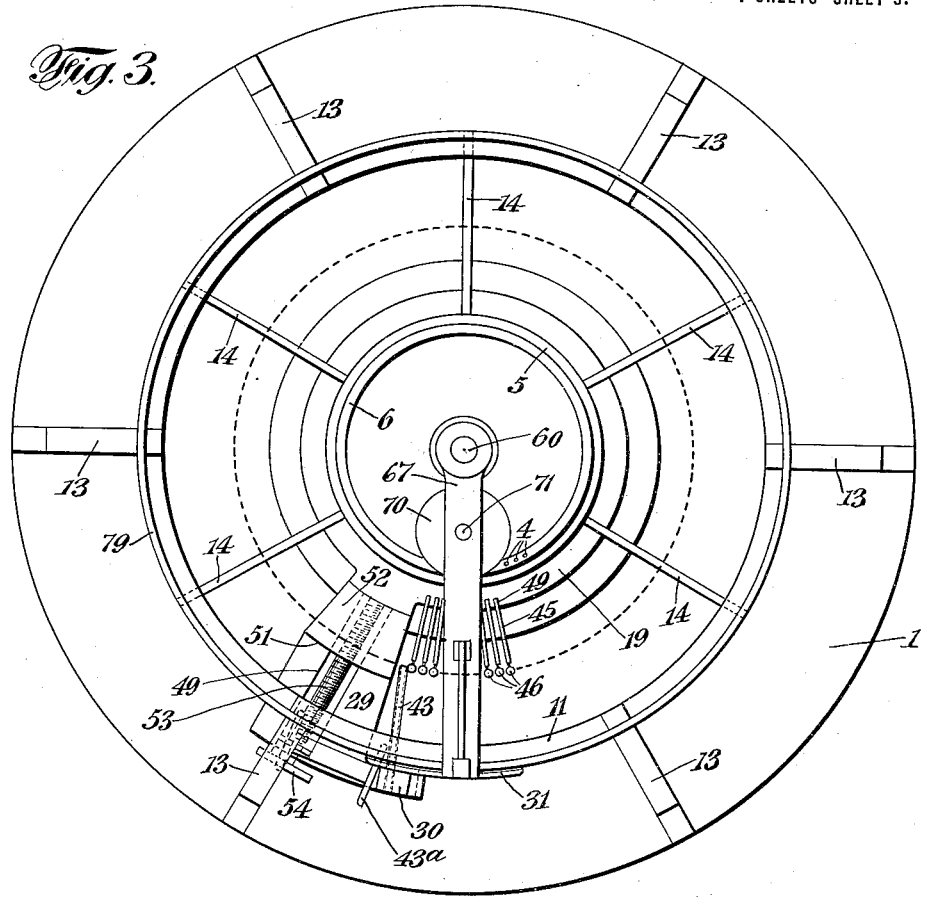
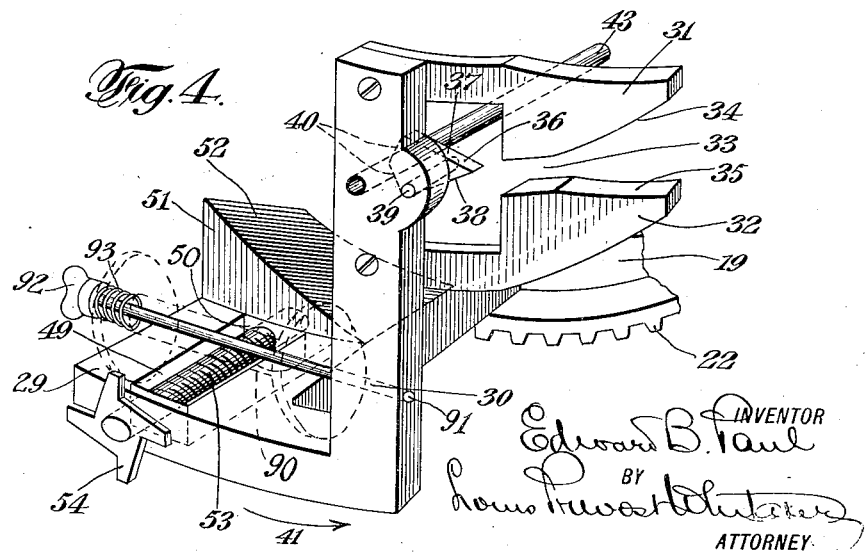

E. B. PAUL.
LOOM FOR WEAVING FLAT RINGS.
APPLICATION FILED JULY 15, 1920.

1,362,134.

Patented Dec. 14, 1920.
7 SHEETS—SHEET 4.

Edward B. Paul, INVENTOR

Louis Prevost Whitcher, ATTORNEY

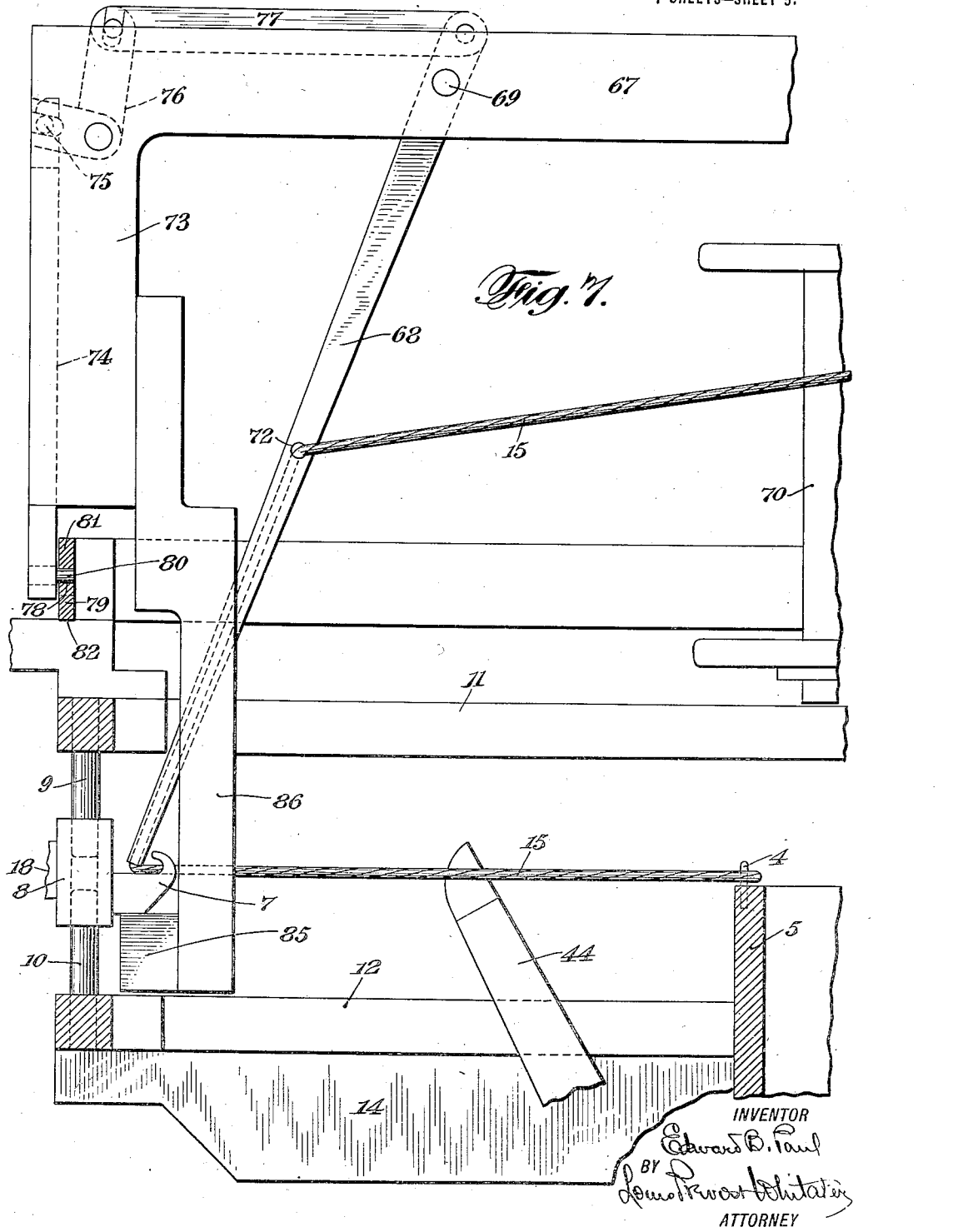

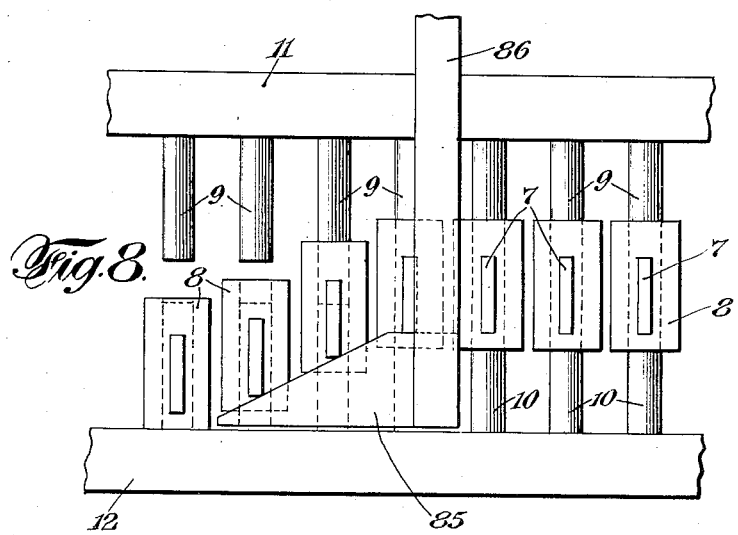
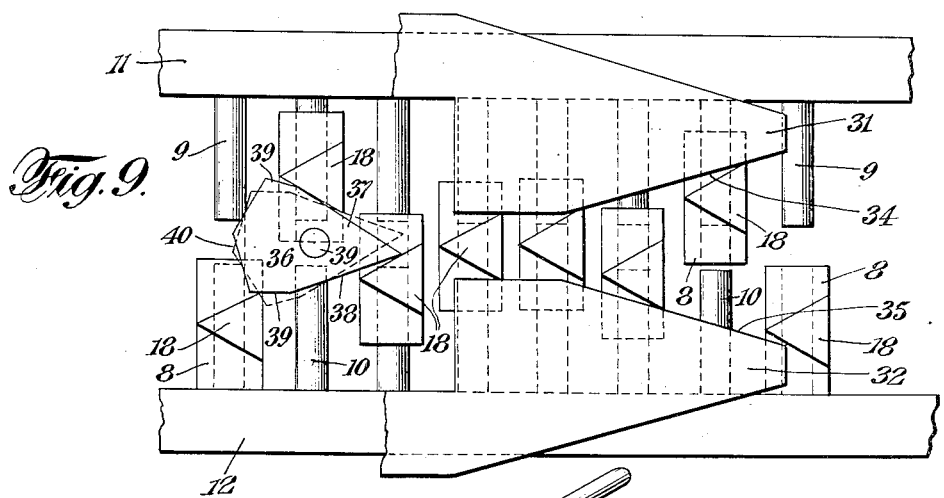
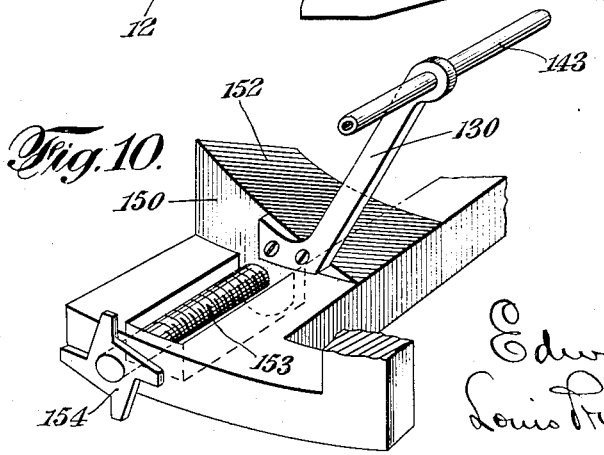

E. B. PAUL.
LOOM FOR WEAVING FLAT RINGS.
APPLICATION FILED JULY 15, 1920.
1,362,134.
Patented Dec. 14, 1920.
7 SHEETS—SHEET 7.
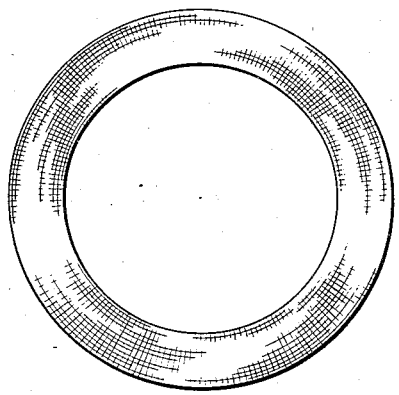
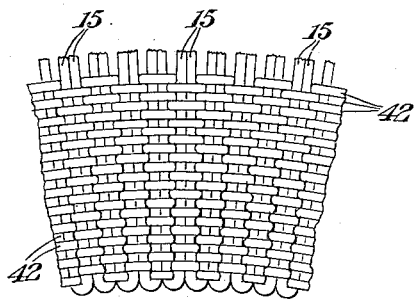
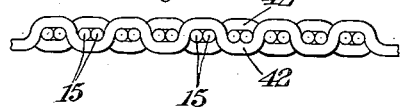
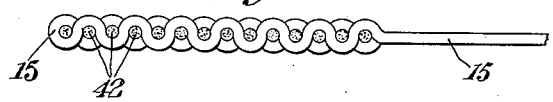
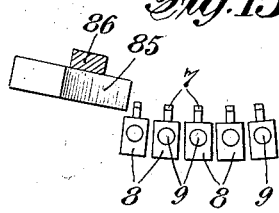
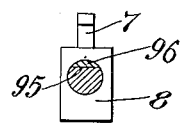
Edward B. Paul INVENTOR
BY Louis Prevost Whitaker ATTORNEY

UNITED STATES PATENT OFFICE.

EDWARD B. PAUL, OF LANCASTER, PENNSYLVANIA, ASSIGNOR TO UNITED STATES ASBESTOS COMPANY, OF LANCASTER, PENNSYLVANIA, A CORPORATION OF PENNSYLVANIA.

LOOM FOR WEAVING FLAT RINGS.

1,362,134.   Specification of Letters Patent.   Patented Dec. 14, 1920.

Application filed July 15, 1920. Serial No. 396,484.

*To all whom it may concern:*

Be it known that I, EDWARD B. PAUL, a citizen of the United States, residing at Lancaster, in the county of Lancaster and State of Pennsylvania, have invented certain new and useful Improvements in Looms for Weaving Flat Rings; and I do hereby declare the following to a be a full, clear, and exact description of the invention, such as will enable others skilled in the art to which it appertains to make and use the same.

My invention consists in the novel features hereinafter described, reference being had to the accompanying drawings which illustrate one embodiment of the same, selected by me for purposes of illustration, and the said invention is fully disclosed in the following description and claims.

My invention consists in a novel form of loom for carrying out the process of weaving and producing flat endless rings invented by Chester L. Hill, and covered by his application for Letters Patent of the United States filed May 20, 1920, and given Serial No. 382,828. Such flat rings, have heretofore usually be made from a larger piece of fabric by cutting it into circular form and then cutting out the central portion, in which case the warp and weft threads are disposed substantially perpendicular to each other, as woven in the larger piece of fabric, and the ring is of unequal tensile strength radially at different points; or a ring may be woven as a substantially straight piece and have its ends brought together and secured, after which it can be given a substantially flat form by stretching or pressing. Such rings are not endless as woven and as these rings are largely used in connection with friction disk clutches, brakes, etc., for automobiles and other mechanical purposes, the use of fastening devices, which are usually of metal, is very objectionable and unsatisfactory. The ring produced by my improved loom, in accordance with the process set forth in the application of Chester L. Hill above referred to, is woven in the form of a flat integral annular ring in which the warp threads extend radially and the weft threads extend around the ring circularly so that the structure of the ring is uniform throughout its entire extent, and it is woven in the final flat circular form, which is produced by the act of weaving. It is preferred that the warp threads, which are supported at points adjacent to the inner and outer marginal edges of the flat ring, shall be formed of a continuous piece of thread, laced back and forth in substantially radial direction between an inner circular series of warp supports and an exterior circular series of warp supports, at least one series of which coincides with a marginal edge of the ring so that the warp thread forms bends or loops adjacent to the warp supports, and it is also preferred to feed the weft thread spirally as a continuous weft thread, the various picks of which are beaten up in a radial direction toward the loops of the warp, which coincide with a marginal edge of the ring, the first pick of the weft being fed within said loops, so as to form a selvage at at least one edge of the ring. Where it is not desired to form the selvage at both edges of the ring, the ring can be woven to the required width and the exterior portions of the warp thread may be cut off or secured in any desired way. It is also preferred to make the distance between the inner and outer series of warp thread supports greater than the width of the ring in order that there shall be sufficient elasticity or take up which such extra length of warp provides to accommodate the thickening of the ring produced by the successive beating of the weft. It is to be understood that these rings are preferably made of thread of the desired size composed in part or whole of asbestos fibers, and that after the rings are formed they may be treated with graphite, grease, waterproofing material, or other substances, and may be compressed in a mold or otherwise to adapt them particularly for use as friction rings in disk clutches, brakes, etc., in the usual manner in which such rings made by other processes are treated after their formation.

In carrying out my invention I have devised a new and unique form of loom for supporting warp threads in radial relation, shedding them to admit of the introduction of picks of weft thread in a circular manner, and preferably in a spiral manner at different distances from the center of the ring to be formed, and provided with beaters for beating up the successive picks of weft in a radial direction with respect to the ring. My improved loom also contains mechanism for automatically laying the warp threads in operative relation with the warp supports so as to hold them in substantially radial positions with respect to the ring to be formed, and my invention further comprises other details of construction hereinafter described and particularly pointed out in the claims. In the following description where I have used the expression "center of the ring," I wish it to be understood that this expression refers to the center of the circle about which the ring is formed, or in other words, the center of the aperture within the inner marginal edges of the ring.

Referring to the accompanying drawings which illustrate one embodiment of my present invention selected by me for purposes of illustration, Figure 1 represents a vertical sectional view of an embodiment of my improved loom.

Fig. 2 represents a side elevation of the same.

Fig. 3 represents a top plan view of the loom, a portion only of the circular series of warp supports and beaters being shown in full lines and the remainder being indicated by dotted circles to avoid duplicating these numerous parts.

Fig. 4 is a perspective view of the portion of the apparatus, movable circularly about the center of the ring to be formed, and provided with means for actuating one series of warp thread supports to shed the warps, means for laying in the weft thread, and means for actuating the beaters.

Figure 6:
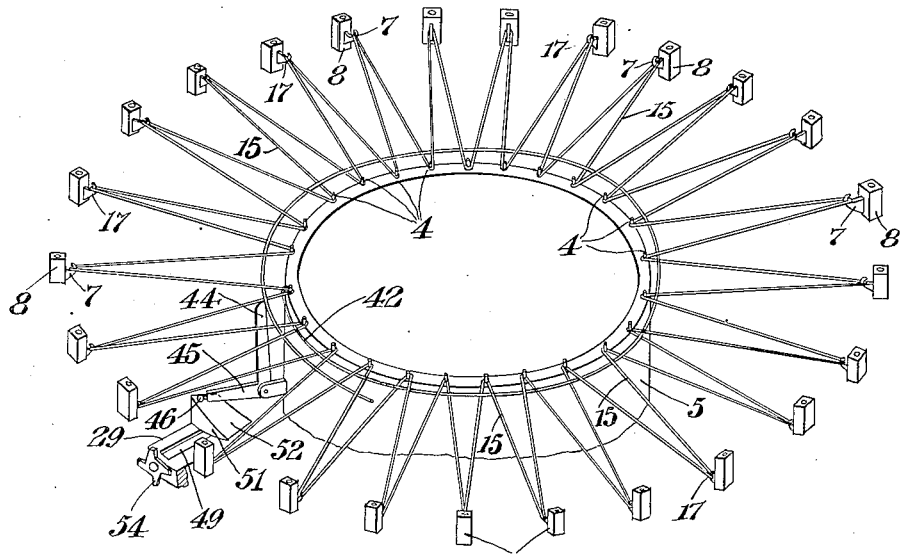

Fig. 6 is a diagrammatic view introduced for the purpose of aiding in the understanding of the operation of the loom, in which are represented, more or less schematically, a smaller number of warp supports in the inner and outer series, the distance between them being greatly exaggerated for the purpose of clearness, and also illustrating a pick of the weft, one of the beaters and the devices for actuating the movable warp supports, and feeding the warp.

Fig. 7 is an enlarged detail sectional view of a portion of the loom, partly in elevation, showing the warp laying devices.

Fig. 8 is a detail view showing the cam associated with the warp laying devices for elevating the movable warp supports, to bring them into proper position to receive the warp thread.

Fig. 9 is a detail of the switch cam for shedding the warps in weaving.

Fig. 10 is a detail view similar to Fig. 4 illustrating a slight modification in which the weft laying device is given movement in a radial direction.

Fig. 11 is a plan view of the ring produced by my improved loom.

Fig. 12 is an enlarged detail of a portion of the ring in plan.

Fig. 13 is a partial edge view of the ring somewhat enlarged.

Fig. 14 is a partial transverse section of the same, also enlarged.

Fig. 15 is a detail plan view of a portion of the outer series of warp supports showing the lifting cam of the warp laying devices.

Fig. 16 is a detail of a modified form of the movable sleeve and guide pins for the outer series of warp supports.

Figure 5:
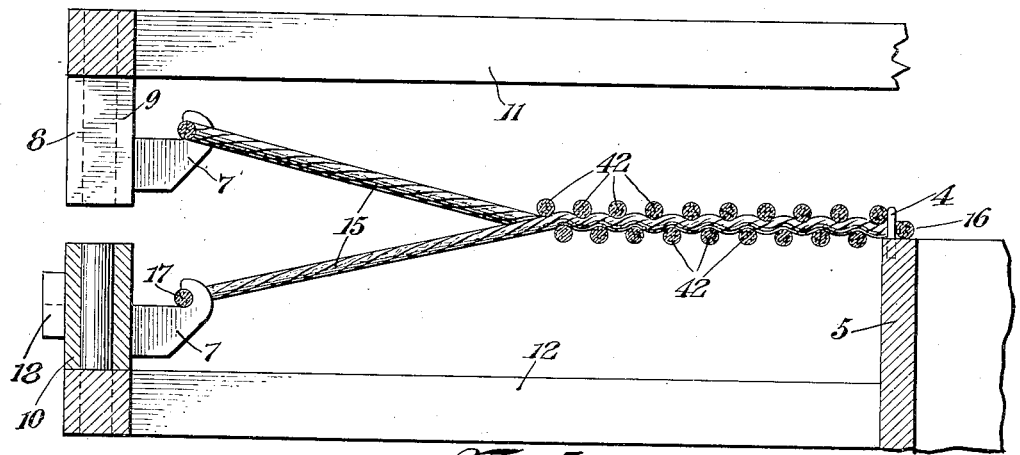
Fig. 5 is an enlarged detail sectional view showing the warp supports in greater detail and illustrating the warp threads and a few of the picks of weft.

Referring to the embodiment of my invention illustrated in the accompanying drawing, 1 represents the bed plate of the machine which is supported in any desired or usual manner, in this instance by means of a supporting device 2 in the form of a tubular column fitted or threaded into a boss or collar 3 on the lower face of the bed plate. On the upper face of the bed plate is provided an inner circular series of warp supports or pins, indicated at 4, which in this instance project from the upper edge of a tubular support 5, which is conveniently secured to the bed plate 1 in any desired manner, as for example, by internally threading it at its lower end, and screwing it upon a hub or boss 6, indicated in the drawings, or it may be supported in any other desired way. The pins 4 preferably extend vertically and are arranged in a circle coaxial with the axis of the machine, in which axis is located the center of the ring to be formed. A second series of warp supports is located concentrically with the series of pins 4, and being of a number corresponding therewith, the exterior series of warp supports being preferably in the form of hooks 7, each of which is secured to a sleeve 8, mounted on opposed pins 9, 10, projecting respectively from annular supporting frames or rings 11, 12, the upper rings 11 being supported by brackets 13 secured to the bed plate 1 at suitable intervals, and the lower ring 12 being supported by brackets 14 projecting at suitable intervals from the central tubular support 5 to which they may be secured in any desired manner. The adjacent ends of the guide pins 9, 10, are separated a sufficient distance, as clearly shown in Fig. 5, to permit of the passage between them of the means for introducing the picks of weft, when the sleeve 8 is in raised or lowered position, and the length of the sleeve 8 and of the pins 9 and 10 is such that by moving the sleeve vertically in one direction or the other, it may be placed wholly in engagement with either the pin 9 or the pin 10 so as to leave the aperture between the ends of the pins free for the passage of such weft feeding device. The sleeves 8 carrying the warp supports 7 of the outer series, fit the pins 9—10 easily, so that while under the tension of the warp threads, these sleeves tend to remain in any position to which they may be moved, they may be readily moved up or down on the pins 9 and 10 by suitable cam mechanism hereinafter described, for the purpose of effecting a separation of adjacent pairs of warps, to form a shed, in the well known manner, as indicated in Fig. 5, within which a weft thread may be fed and beaten up, preferably toward the inner series of warp supports 4.

As before stated, it is preferred to use a continuous warp thread which is passed back and forth in substantially radial directions from a warp support 4 to the corresponding warp support 7, thence to the next warp support 4, and thence to the next warp support 7, and so on around the entire circle of the loom in a manner diagrammatically illustrated in Fig. 6, so that the portions of the warp thread extending from the supports 4 of the inner series to the supports 7 of the outer series will occupy substantially radial positions with respect to the center of the ring to be formed, and I have shown the loom provided with mechanism hereinafter described for automatically laying in the warp in this manner. The warp is illustrated at 15, and it will be noticed that it forms a bend or loop where it passes around each of the pins 4 of the inner series of warp supports, and a similar loop or bend 17 where it passes around each of the hooks 7 of the outer series of warp supports. Each of the sleeves 8 is provided with cam engaging means whereby the sleeve can be moved up or down as the case may be, alternately, as hereinafter described, and in this instance I have shown each of these sleeves provided with a cam engaging lug 18 of substantially triangular shape, the apices of the triangles extending horizontally, and in the same direction as indicated in Fig. 2. In order to introduce and interweave with the warp threads the successive picks of weft, it is necessary to separate adjacent warp threads vertically, as indicated in Fig. 5, to form the shed. I find it convenient to do this continuously around the circle of the machine by moving the alternate sleeves 8 in one direction, and the intervening sleeves 8 in the opposite direction, and to move each sleeve in the reverse direction before the next pick of weft is introduced. In other words, the sleeves 8 are moved alternately in opposite directions during one circular movement or rotation of the actuating cam and each sleeve 8 is moved in opposite directions in successive circular movements or rotations of the actuating cam.

The required movements of the warp supports can be effected in various ways, but I have found it convenient to employ an actuating cam mechanism illustrated herein and shown in detail in Fig. 4. Supported upon the base plate is a rotary part 19 which preferably surrounds the tubular support 5 and is preferably supported by an annular series of balls, indicated at 20, traveling in ball races, one of which is formed on the rotary part 19 and the other upon the plate 1, or on a stationary ring 21 secured thereto. The rotary part 19 is preferably provided at its periphery with gear teeth, as indicated at 22, forming a gear wheel which meshes with a bevel gear 23 on a short shaft 24, the said bevel wheel having secured thereto a gear 25 meshing with a pinion 26 on a driving shaft 27 to which motion may be imparted by means of a belt wheel 28 or other suitable means from a motor, countershaft, or other source of power, for imparting circular motion to the rotary device 19 which I prefer to call the cam ring. This cam ring 19 is provided with a radial outwardly projecting bracket 29 carrying an upwardly extending arm 30, to which are secured the centering cams 31 and 32 having a sufficient space between them, as indicated at 33, to permit the passage of the angular cam engaging projections 18 of the sleeves 8 carrying the outer series of warp supports 4, and being provided respectively with upwardly and downwardly extending cam faces 34 and 35 to engage said projections 18 whether the same are in the upward or downward positions, and restoring them to central position, as the centering cams travel around the circle of the machine. In rear of the centering cams, the arm 30 is provided with a tilting actuating switch cam, indicated at 36, which is pivoted centrally and is provided with converging cam surfaces 37 and 38, converging forwardly or to the right in Fig. 4, and extending rearwardly beyond the pivotal support for the cam, which is indicated at 39, the rear portion of the cam being preferably beveled or rounded, as indicated at 40 in Fig. 4. The direction of movement of the cam ring is indicated by the arrow 41, in said figure. As the cam ring 19 is rotated, for example, by the gearing hereinbefore described, the centering cam faces 34, 35 will bring each of the cam engaging projections 18 on the sleeves 8 of the warp supports 7 into central position vertical with respect to the pins 9 and 10, and as the movement of the cam ring proceeds each of the projections 18 will pass through the space 33 between the centering cams 31 and 32, and will engage one face 37 or 38 of the tilting actuating cam 36, according as that cam is inclined or tilted in an upward or downward direction. If the cam 36 is tilted downwardly the projection 18 will engage the face 37 of the cam and raise the projection 18, and the sleeve 8 connected therewith into its highest position wholly upon the pin 9 of the upper supporting ring 11 and the construction is such that the sleeve 8 reaches its highest position in which it is limited by engaging the ring 11 before the projection 18 passes entirely off of the inclined face 37 of the cam 36 so that the further movement forwardly of the cam 36 effects a tilting of the cam upon its axis and raises the point of the cam 36 so that the projection 18 of the next adjacent warp thread support will engage the lower face 38 of the cam and be moved downwardly or in the opposite direction from the preceding one until arrested by the contact between the sleeve 8 thereof and the lower supporting ring 12 when the movement of the sleeve will be stopped and the further movement of the cam ring will tilt the cam 36 on its axis or pivot and throw the point of the cam downward in position to raise the projection and sleeve 8 of the next warp thread support. In the same manner as the cam ring 19 rotates, it will thus be seen that the alternate warp thread supports will be raised and lowered respectively, or in other words, will be moved in opposite directions by means of the shifting or switch cam 36. By employing an odd number of warp supports in the exterior series, actuated by the cam mechanism hereinbefore described (and of course a corresponding number in the inner series) as soon as the cam ring has completed one revolution, or circular movement, it will, during the next circular movement, repeat the operation, except that each of the warp supports which was previously moved in a downward direction, will now be moved in an upward direction, thus making a reverse shed to that made during the previous revolution, between the adjacent pairs of warp threads carried by the warp supports 7. The weft thread, which is indicated in the drawings at 42, is laid in circularly, and is preferably a continuous thread, which is therefore fed and interwoven in a spiral manner. In the present instance I have shown the arm 30 carried by the bracket 29 secured to the cam ring 19 provided with a horizontally disposed tubular thread guide 43, in line with the space between the ends of the pins 9 and 10 carrying the vertically movable sleeves 8. This thread guide is open at both ends and a weft thread, which may be drawn from a suitable cop or bobbin 90, on a spindle 91, provided with a wing nut 92 and tension spring 93, and supported by the arm 30, for example, or other suitable part of the loom, is threaded through the tubular thread guide 43 from the outer end to the inner end thereof, so as to be fed under one pair of warp threads, over the next pair, under the following pair, and so on around the circle of the machine as the alternate pairs of warp threads are raised and lowered to form a shed for the introduction of the weft in the manner previously described.

I prefer to provide means for immediately beating up the weft thread throughout each pick thereof as it is laid between the adjacent pairs of warps, and to this end I prefer to provide a number of beaters located between the adjacent warp supports, and each movable in a radial direction, preferably toward the inner series of warp supports 4, as herein shown. In this instance each of these beaters consists of an L-shaped device or bellcrank provided with a vertically disposed arm 44 which I term the beating arm, and a horizontally disposed arm 45, which I term the actuating arm, which terminates preferably at its outer end in an anti-friction roll 46. Each of these beaters is pivotally supported at 47 in a supporting bracket or ring 48, surrounding the central tubular support 5 and secured thereto above the cam ring. It will be readily understood that when the first pick of the weft is fed in, the beaters are to be actuated to a sufficient extent to force the weft thread into close relation with the inner series of warp supporting pins 4, which are substantially coincident with the inner edge of the ring to be formed, and that as successive picks of weft are fed by successive revolutions of the cam ring and weft feed, the beaters require to be given a shorter throw as the formation of the ring progresses. To this end I provide the bracket 29 carried by the cam ring 19 (see Fig. 4) with a radial slot 49 in which is mounted a radially movable block 50 carrying a cam 51 having an inclined face 52 adapted to engage the friction rolls 46 of the actuating arms 45 of the beaters, and impart the desired throw in a radial position to the beating arms 44 thereof, toward the pins 4. The bracket 29 is shown as provided with a screw shaft 53 rotatably mounted in the bracket and extending lengthwise of the slot 49 and engaging a threaded aperture in the block or slide 50. The screw shaft 53 is also provided with a star wheel 54 or equivalent means which engages a trip or trips 55 (see Fig. 2) as the cam wheel rotates, thereby rotating the screw shaft 53 in such a direction as to gradually move the block 50 and cam 51 outwardly in a radial direction, during successive rotations of the cam ring 19. The cam face 52 of the cam 51 is made of considerable breadth in a direction radially of the machine so as to maintain contact with the friction rolls 46 of the beaters, and at the same time permit of the necessary radial movement of the cam 51 and the shape of the cam 52 is such that as the cam 51 is gradually shifted outwardly the movement imparted to each beater by the revolution of the cam ring will be gradually decreased during successive rotations of the cam ring 19. The machine may be provided with one or more trips 55 for the purpose of tripping the star wheel 54 one or more times during a revolution of the cam ring as may be necessary to effect the desired radial movement of the cam 51 and gradually decrease the throw of the beaters in the weaving of the ring. As soon as the arm 45 of each beater passes off of the cam face 52 of the cam 51, the beater is returned to normal position by the weight of the horizontally disposed arm 45 and its friction rolls 46 (or by suitable springs if necessary) and will remain in this position until again actuated by the cam 51. As the cam 51 is located immediately in rear of the thread guide 43, the picks of the weft thread, as soon as laid in between the separated pairs of warps, as before described, will be immediately pressed in a radial direction toward the inner edge of the ring, so that just a sufficient quantity of weft is delivered during each rotation of the cam 19 that is required for the pick in the particular location in the ring structure to which it is immediately beaten up, and obviously as the formation of the ring proceeds, a somewhat greater quantity of weft will be drawn off and beaten up during successive rotations of the cam ring. I prefer to so arrange the parts that the action of the beaters follows very closely the laying in of the thread by the weft thread delivering means, so that the beaters actually draw the weft thread through the tubular thread guide 43 to a greater or less extent as required for the different picks of weft.

In some instances I have contemplated imparting a radial movement to the thread guide itself so that the thread guide is gradually moved outwardly in a radial direction as the weaving of the ring progresses, or in other words, moves radially toward the unfinished edge of the ring. This may be readily accomplished by supporting the tubular thread guide upon the block which carries the cam for operating the beaters, for example, so that the thread guide will move outwardly in a radial direction as the cam is moved under the influence of the screw shaft and star wheel, or other suitable mechanism. In Fig. 10 I have illustrated such a modification of the apparatus shown in Fig. 4 in which the thread guide is indicated at 143, and is carried on an arm 130, extending upwardly from the block 150 carrying the cam 151, the face 152 of which actuates the beaters, the block 150 being operated by the shaft 153 and star wheel 154 in the same manner as previously described, it being understood that the other parts of the apparatus are as herein described with respect to the other figures of drawing.

Obviously the continuous warp thread 15 can be laid in and supported upon the pins 4 and hooks 7 by hand, the opposite ends being secured at or about the same point, and conveniently to one of the pins 4. In order to facilitate the laying of the warp threads and the manufacture of these flat woven rings, I prefer to provide automatic means for laying in the warp thread and such means are shown in the accompanying drawings, in which 60 represents a vertically disposed shaft extending through a suitable step bearing 61 on the bed plate 1, said shaft having its axis coincident with the axis of the entire machine, and the centers of the circular series of warp supports. The lower end of this shaft is conveniently provided with suitable means for rotating it, as for example, a bevel gear 62 engaging a bevel gear 63 on a driving shaft 64, supported in a bearing 65, secured to the supporting column 2, and provided with means for rotating it, as the crank or handle 66. The upper end of the shaft 60 is provided with a rotating part preferably in the form of an arm 67, extending radially from the shaft, and pivoted to said arm is a radially swinging thread delivering device 68 which is capable of oscillation on its pivot 69. This warp delivering device 68 is provided with means for delivering the warp yarn 15 which is conveniently carried on a spool 70 supported on a pin 71 secured to the arm 67, and in this instance I have shown the lower end of the warp delivering device as of tubular form to provide a passage, indicated at 72, to the lower end of the swinging device to deliver the yarn therefrom. It will be understood that as the arm 67 rotates around the circle of the machine, the device 68 is swung back and forth radially between and around the respective hooks 7 and pins 4, so as to lay the warp thread in engagement therewith, in the manner indicated in Fig. 6 of the drawing. This oscillating movement may be imparted to the device 68 in any desired way. In the present instance I have shown the arm 67 provided with a depending part 73 carrying a vertically reciprocating slide 74, the upper end of which is provided with a pin 75 engaging a recess in one arm of a bell crank lever 76 pivotally mounted on the arm 67, the other arm of the lever being connected by a link 77 to the upper end of the oscillating thread delivery device 68, and being pivotally connected at its opposite ends to the arm 76 and to the device 68, as shown in Fig. 1. Vertical movement is imparted to the slide 74 by means of a fluted or serrated cam track or groove indicated at 78 in the outer face of a stationary ring 79 which is engaged by a pin 80 on the vertical slide 74. The ring 79 is mounted on the frame work of the machine, in this instance by means of the brackets 13 which support the upper ring 11 hereinbefore described, and the fluted or curved cam track 78 is conveniently formed by applying to the outer face of the ring 79 an upper and lower face ring 81, 82, respectively, having their opposed edges serrated in the manner shown in Fig. 2, so as to form an endless serrated track, the serrations of which correspond with the number of warp supporting devices and are so formed as to impart the desired oscillating movements to the warp thread laying device 68 as it is carried around the circle of the machine to cause the warp thread to be placed in engagement with the pins 4 and the opposite hooks 7 so as to hold the warp thread sections in substantially radial positions, in the manner hereinbefore described. As the sleeves 8 of the outer series of warp supports engage their guide pins with an easy sliding movement, when there is no warp thread on the machine, that is to say after the removal of a completed ring, for example, and before the warps for a new ring have been placed in position, the sleeves 8 will naturally drop to their lowest positions. It is therefore necessary to raise the sleeves 8 and the hooks 7 carried thereby to a uniform height to receive the warp thread from the oscillating warp laying device 68 in order that the thread may be properly placed in engagement with the hooks 7. This may be accomplished in any desired way, and in the present instance I have shown a cam 85 carried on an extension arm or bracket 86 depending from the part 73 carried by the rotating arm 67. This cam 85 is provided with an inclined surface to engage the under surface of the hooks 7 or other parts connected with the sleeves 8, and thereby elevating them to a uniform height as the warp laying device is moved around the circle, so that each hook 7 will be at the proper elevation to receive the warp thread. The sleeves 8 will tend to remain in this position owing to the tension of the warp thread, but this is immaterial as the centering cams of the loom would bring them into proper position to engage the switch cam in any event.

It is also desirable that the sleeves 8 be prevented from rotation on their respective guide pins, and this can be accomplished in any desired manner, as by forming the guide pins and sleeves polygonal in cross section (square or triangular), or by providing the pins with a flattened portion 95 as indicated in Fig. 16 in case they are made circular in cross section, and providing a pin or fillet 96 in each sleeve to coöperate with the flattened faces of the pins. It is to be understood, however, that the sleeves 8 are so close together that no material rotation thereof is possible and in case the warp laying device is dispensed with, it would be immaterial whether or not the sleeves 8 were prevented from rotating on the pins, as in such case the warp thread would be laid by hand and in either case the tension of the warp threads would hold the sleeves in proper position during the weaving operation.

After the warp thread is laid and the final end secured, ready to commence the weaving operation, the warp laying apparatus can be placed in such position as not to interfere with the weaving, as by swinging the warp laying device 68 inside of the circle of the pins 4, for example as indicated in Fig. 1. The warp threads being in proper position, as indicated in Fig. 6, and the weft thread being supplied to the weft thread delivering device or tube 43, motion may be imparted to the cam ring 18 by the mechanism previously described, so as to rotate the said ring, carrying with it the centering cams and switch cam and thread delivering device 43, also the beater actuating cam 51, which at the commencement of the weaving operation will be at its innermost position on the form of apparatus herein shown. As the cam ring 19 rotates the vertically movable sleeves 8 carrying the hooks 7 of the outer series of warp supports will be moved as hereinbefore described so as to shed the warps and permit the weft thread to be laid under one pair of warps and over the next pair, under the next pair, and so on. As the first pick of the weft is laid in in this manner and beaten up by the beaters as fast as it is delivered from the tube 43, it will be pressed by the beaters into close engagement with the pins 4 of the inner circular series of warp supports, and by reason of the manner in which the warp threads are laid, as shown in Figs. 5 and 6, the first pick of the weft, as schematically illustrated in Fig. 6, will be laid in the loops or bends of the warp thread which pass around the pins 4, so that when the ring is completed and is disengaged from the pins 4, a selvage will be formed at the inner edge of the ring. As the several picks of weft are fed in spirally around the circle of the machine, the movement of the sleeves 8 in each successive course in the opposite direction from that in which it was moved in the preceding course, will effect the opposite shedding of the warps 15 and the throw of the beaters will gradually decrease as the formation of the ring progresses by the outward movement of the cam 51, as hereinbefore described. The ring is therefore woven in true circular form with radial warps and circular or spiral wefts until the required width of ring has been produced. As before stated, the width of the ring is preferably less than the distance between the inner and outer series of warp supports in order that the extra length of warps may furnish the necessary elasticity to compensate for the thickening of the fabric as it is formed, and after the ring is completed it is removed from the warp supports 4 and 7 and the excess length of the warp threads extending beyond the last pick of the weft may be cut off, and if desired, the ends may be secured in any desired manner. In the manufacture of asbestos friction rings of the kind hereinbefore referred to, the subsequent treatment of the ring by saturating it with lubricating material, grease, graphite, or water-proofing material, or other suitable substance, and subsequent compression in a mold to standardize it in thickness, prevents the possibility of the ring raveling at its outer edge even if the ends of the warp threads are cut off without being secured, but the ends of the threads may be secured by turning them in or sewing them into the ring, or by tying them together in pairs, or in any other desired way.

In Fig. 8 I have shown a plan view of the ring, an enlarged detail of a section of the same being shown in Fig. 9 to show the relation of the threads, and in Figs. 10 and 11 I have shown respectively an edge view of the ring and a transverse section thereof for the same purpose.

No claim is made herein to the ring itself or the process of weaving the same.

What I claim and desire to secure by Letters Patent is:—

1. In a loom for weaving flat rings, the combination of means for supporting a plurality of warps in radial positions with respect to the center of the ring to be woven, and means moving circularly for feeding weft threads and interweaving them with said warp threads, and means having a variable movement radially, for beating up the weft.

2. In a loom for weaving flat rings, the combination of means for supporting a plurality of warps in radial positions with respect to the center of the ring to be woven, means moving circularly for feeding weft threads and interweaving them with said warp threads, and means movable radially with respect to said center for beating up the wefts radially toward an edge of the ring.

3. In a loom for weaving flat rings, the combination of means for supporting a plurality of warps in radial positions with respect to the center of the ring to be formed, means for moving said warps at one end thereof in directions perpendicular to the plane of the ring, to shed them, and means traveling in a substantially circular path for laying in picks of weft, at different distances from an edge of the ring interweaving them with said warps, radially movable beaters, and means for imparting a variable movement thereto.

4. In a loom for weaving flat rings, the combination of means for supporting a plurality of warps in radial positions with respect to the center of the ring to be formed, means for moving said warps at one end thereof in directions perpendicular to the plane of the ring, to shed them, and means traveling in a substantially circular path for laying in picks of weft, and interweaving them with said warps, beaters movable in a radial direction between adjacent warps for beating up the picks of weft.

5. In a loom for weaving flat rings, the combination of means for supporting a plurality of warps in radial positions with respect to the center of the ring to be woven, a weft feeding device movable in a circular path around the center of the ring, and provided with a thread delivery device movable radially to vary its distance from said center.

6. In a loom for weaving flat rings, the combination of means for supporting a plurality of warps in radial positions with respect to the center of the ring to be woven, a weft feeding device movable in a circular path around the center of the ring, and means movable in directions toward and from said center for beating up the picks of weft in a radial direction toward an edge of the ring.

7. In a loom for weaving flat rings, the combination of means for supporting a plurality of warps in radial positions with respect to the center of the ring to be woven, and means moving circularly for feeding weft threads and interweaving them with said warp threads, means movable radially toward and from the center of the ring, for beating up the picks of weft toward an edge of the ring, and means for varying the extent of movement imparted to said beating means during the formation of the ring.

8. In a loom for weaving flat rings, the combination of means for supporting a plurality of warps in radial positions with respect to the center of the ring to be woven, a weft feeding device movable in a circular path around the center of the ring, means movable in directions radially toward and from the center of the ring for beating up the picks of weft toward an edge of the ring, and means for varying the extent of movement imparted to said beating means.

9. In a loom for weaving flat rings, the combination of two concentric circular series of warp supports for holding a plurality of warp threads in radial positions, the warp supports of at least one series being movable in directions substantially perpendicular to the plane of the ring to be formed, means for moving said movable warp supports to shed the warps, and a circularly movable weft feeding device for laying in substantially circular picks of weft, and radially movable means for beating up the picks of weft toward an edge of the ring.

10. In a loom for weaving flat rings, the combination of two concentric circular series of warp supports for holding a plurality of warp threads in radial positions, the warp supports of at least one series being movable in directions substantially perpendicular to the plane of the ring to be formed, a weft feeding device movable circularly for laying in substantially circular picks of weft, and means for moving said movable warp supports in opposite directions during successive circular movements of the weft feeding device to shed the warps, radially movable beaters for beating up the weft, and means for imparting variable movement to said beaters.

11. In a loom for weaving flat rings, the combination of two concentric circular series of warp supports for holding a plurality of warp threads in radial positions, the warp supports of at least one series being movable in directions substantially perpendicular to the plane of the ring to be formed, a weft feeding device movable circularly for laying in substantially circular picks of weft, and means for moving alternating warp supports of the series of movable warp supports in opposite directions during the circular travel of said weft feeding device, radially movable beaters, and means for imparting variable movement to said beaters.

12. In a loom for weaving a flat ring, the combination of two circular concentric series of warp supports for supporting a plurality of warp threads in radial positions, a circularly movable weft feeding device, and a plurality of beaters arranged in a circular series concentric with the warp supports, and movable radially with respect thereto to beat up the successive picks of weft.

13. In a loom for weaving a flat ring, the combination of two circular concentric series of warp supports for supporting a plurality of warp threads in radial positions, a circularly movable weft feeding device, and a plurality of beaters arranged in a circular series concentric with the warp supports, and movable radially with respect thereto to beat up the successive picks of weft, and means for imparting a variable stroke to said beaters.

14. In a loom for weaving a flat ring, the combination of two circular concentric series of warp supports for supporting a plurality of warp threads in radial positions, a circularly movable weft feeding device, and a plurality of beaters arranged in a circular series concentric with the warp supports, and movable radially with respect thereto to beat up the successive picks of weft, and a beater actuating device for actuating said beaters successively.

15. In a loom for weaving a flat ring, the combination of two circular concentric series of warp supports for supporting a plurality of warp threads in radial positions, a circularly movable weft feeding device, and a plurality of beaters arranged in a circular series concentric with the warp supports, and movable radially with respect thereto to beat up the successive picks of weft, and beater actuating means movable circularly in timed relation with the weft feeding device for successively actuating said beaters.

16. In a loom for weaving a flat ring, the combination of two circular concentric series of warp supports, for holding a plurality of warps in radial positions, a circular series of beaters movable radially with respect to and between adjacent warp threads, a circularly movable weft thread feeding device, beater actuating means for successively actuating said beaters, and means for varying the stroke of the beaters.

17. In a loom for weaving a flat ring, the combination of two circular concentric series of warp supports, for holding a plurality of warps in radial positions, a circular series of beaters movable radially with respect to and between adjacent warp threads, a circularly movable weft thread feeding device, provided with a thread delivery device, movable radially with respect to the center of the ring to be formed, means for varying the position of the thread delivery device radially in successive revolutions of the weft feed, and means for actuating said beaters successively.

18. In a loom for weaving a flat ring, the combination of two circular concentric series of warp supports, for holding a plurality of warps in radial positions, a circular series of beaters movable radially with respect to and between adjacent warp threads, a circularly movable weft thread feeding device, provided with a thread delivery device, movable radially with respect to the center of the ring to be formed, means for varying the position of the thread delivery device radially in successive revolutions of the weft feed, circularly movable means operating in timed relation with the weft feeding device, for successively actuating said beaters, and means for varying the stroke of the beaters in successive revolutions of said beater actuating means.

19. In a loom for weaving flat rings, the combination of two concentric circular series of warp supports, for holding a plurality of warp threads in radial positions, the supports of one series being movable in directions perpendicular to the plane of the ring to be formed, a rotary cam for shifting said movable warp support, to shed the warps, a circularly movable weft feed having a thread delivery device movable radially, a plurality of pivotally mounted beaters arranged in a circle concentric with said series of warp supports, and movable in directions radial with respect thereto, a circularly movable cam for actuating said beaters, and means for moving said cam radially to vary the throw of the beaters.

20. In a loom for weaving flat rings, the combination of a circular series of warp supports of a concentric series of supporting pins, disposed substantially perpendicularly to the plane of the ring to be formed, movable warp supports provided with sleeves movably engaging said pins, and having cam engaging portions, means movable circularly for feeding a weft thread, and a rotary cam for actuating the said sleeves to shed the warps.

21. In a loom for weaving flat rings, the combination of two concentric series of warp supporting devices, the devices of one series being movable in directions perpendicular to the plane of the ring to be formed, a circularly movable pivotally mounted switch cam for actuating said movable supporting devices, and means for swinging said cam alternately in opposite directions after each actuating contact with one of said movable supporting devices, to effect the shedding of the warps, and circularly movable means for feeding a weft thread, and means for beating up the weft thread in a radial direction with respect to said supporting devices.

22. In a loom for weaving flat rings, the combination of two concentric series of warp supporting devices, the devices of one series being movable in directions perpendicular to the plane of the ring to be formed, and provided with cam engaging projections, a circularly movable pivotally mounted switch cam for engaging said projections and actuating said movable supports, said cam being provided with tripping portions for engaging said projections to shift the position of the cam alternately, after each actuating contact with one of said movable supporting devices, means for feeding circular picks of weft, and means for beating up the weft in a radial direction with respect to said series of warp supporting devices.

23. In a loom for weaving flat rings, the combination of two concentric series of warp supporting devices, the devices of one series being movable in directions perpendicular to the plane of the ring to be formed, and provided with cam engaging projections, and a circularly movable cam mechanism provided with means for engaging said projections to effect the shedding of the warps, and with means for engaging said projections to restore said movable warp supporting devices to normal position, means for feeding a weft thread circularly, radially movable beaters for beating up the weft thread, and means for imparting variable movement to said beaters.

24. In a loom for weaving flat rings, the combination of two concentric series of warp supporting devices, the devices of one series being movable in directions perpendicular to the plane of the ring to be formed, and provided with cam engaging projections, and a circularly movable cam mechanism provided with a pivotally mounted switch cam having tripping portions, and centering cam faces for engaging said projections and restoring said movable warp supporting devices to normal position.

25. In a loom for weaving flat rings, the combination of two series of warp supporting devices arranged in two concentric circles, of different diameters, means for laying a continuous warp thread having portions extending radially from the warp supporting devices of one series to those of the other series, said warp laying means comprising a thread delivering device, movable around the center of said circular series of warp supporting devices, and means for imparting back and forth movement to said device from the supporting devices of one series to those of the other series during its circular travel.

26. In a loom for weaving flat rings, the combination with an inner circular series of warp supports and an outer circular series of warp supports arranged concentrically therewith, weft feeding means movable circularly for feeding a weft thread and interweaving it with radial warps carried by said warp supports, and beating means movable in a radial direction for beating up the weft, of a warp laying device, having a circular movement around the center of said series of warp supports and a back and forth movement from the warp supports of one series to those of the other series, for laying in a continuous warp thread having radially disposed portions.

27. In a loom for weaving flat rings, the combination with an inner circular series of warp supports and an outer circular series of warp supports arranged concentrically therewith, weft feeding means movable circularly for feeding a weft thread and interweaving it with radial warps carried by said warp supports, and beating means movable in a radial direction for beating up the weft, of a warp laying device comprising a rotatable part movable in a path around the center of said series of warp supports, a warp delivery device carried by said rotary part and movable in substantially radial directions, means for imparting rotary movement to said rotatable part, and means for imparting radial movements to said warp delivery device, to lay a continuous warp thread extending radially from the supports of one series to those of the other.

28. In a loom for weaving flat rings, the combination with an inner circular series of warp supports and an outer circular series of warp supports arranged concentrically therewith, weft feeding means movable circularly for feeding a weft thread and interweaving it with radial warps carried by said warp supports, and beating means movable in a radial direction for beating up the weft, of a warp laying device comprising a rotatable part movable in a path coaxial with the said circular series of warp supports, a swinging arm carried by said rotatable part and movable in a radial direction from the supports of one series to those of the other, means for rotating said rotary part, and means for oscillating said swinging arm to lay a continuous warp thread having radial portions extending from the supports of one series to those of the other series.

29. In a loom for weaving flat rings, the combination of a circular series of warp supports, of a circular frame concentric therewith but of different diameter, supporting pins carried by said frame and disposed perpendicularly to the plane of said frame, movable sleeves carried by said pins, warp supports carried by said sleeves, cam engaging projections on said sleeves, a rotary cam for engaging said projections, to shed the radial warps carried thereby, and a rotary weft laying device.

30. In a loom for weaving flat rings, the combination of a circular series of warp supports, of a circular frame concentric therewith but of different diameter, supporting pins carried by said frame and disposed perpendicularly to the plane of said frame, movable sleeves carried by said pins, warp supports carried by said sleeves, cam engaging projections on said sleeves, a rotary cam for engaging said projections, to shed the radial warps carried thereby, a rotary weft laying device, and a warp laying device comprising a rotary part, a warp delivering device carried thereby and movable radially with respect thereto.

31. In a loom for weaving flat rings, the combination of a circular series of warp supports, a second series of warp supports arranged in a concentric circle of different diameter, and each comprising a slide movable in directions perpendicular to the plane of the ring to be formed, and a warp engaging part carried by said slide, cam engaging projections on said slides, a rotary cam for engaging said projections and moving said slides to shed the radial warps connected therewith, a rotary weft laying device, a plurality of beaters movable radially with respect to the said series of warp supports, for beating up the weft, and means for imparting variable movement to said beaters.

32. In a loom for weaving flat rings, the combination of a circular series of warp supports, a second series of warp supports arranged in a concentric circle of different diameter, and each comprising a slide movable in directions perpendicular to the plane of the ring to be formed, and a warp engaging part carried by said slide, cam engaging projections on said slides, a cam supporting part movable in a path coaxial with the warp supports, a pivotally mounted switch cam carried by said supporting part, and provided with means for shifting said cam on its pivot after each engagement thereof with one of said projections, to shed the warps, and a circularly movable weft laying device.

33. In a loom for weaving flat rings, the combination of a circular series of warp supports, a second series of warp supports arranged in a concentric circle of different diameter, and each comprising a slide movable in directions perpendicular to the plane of the ring to be formed, and a warp engaging part carried by said slide, cam engaging projections on said slides, a rotary cam carrier, a pivoted switch cam carried thereby, for engaging said projections and actuating said slides, said cam being provided with tripping portions to engage said projections after actuating the slide connected therewith and trip the cam, to effect a movement of the next slide in the opposite direction.

34. In a loom for weaving flat rings, the combination of a circular series of warp supports, a second series of warp supports arranged in a concentric circle of different diameter, and each comprising a sleeve movable in directions perpendicular to the plane of the ring to be formed, and a warp engaging part carried by said sleeve, a circular series of supporting pins engaging said sleeves, a second series of supporting pins, each of which is in axial alinement with, but separated from, a pin of the first mentioned series for engaging said sleeves, means for shifting said sleeves from a pin of one series to a pin of another series, to shed the warps, and weft thread feeding means having a part adapted to pass between the ends of said alined pins to feed the weft and interweave it with the warp thread.

35. In a loom for weaving flat rings, the combination of a circular series of warp supports, a second series of warp supports arranged in a concentric circle of different diameter, and each comprising a sleeve movable in directions perpendicular to the plane of the ring to the formed, and a warp engaging part carried by said sleeve, a circular series of supporting pins engaging said sleeves, a second series of supporting pins, each of which is in axial alinement with, but separated from, a pin of the first mentioned series for engaging said sleeves, each of said sleeves being provided with a cam engaging part, a pivoted switch cam movable in a rotary direction provided with cam faces for shifting said sleeves from a pin of one series to a pin of the other series to shed the warps, said faces extending on opposite sides of the point of pivoting of the cam to provide means for tilting the cam on its pivot, and means for limiting the movement of said sleeves in both directions under the influence of said cam, whereby after each sleeve is arrested further movement of the cam upon its pivot causes it to move the adjacent sleeve in the opposite direction.

In testimony whereof I affix my signature.

EDWARD B. PAUL.